United States Patent [19]

Hooke et al.

[11] 4,385,100

[45] May 24, 1983

[54] TERMINAL APPARATUS FOR ELECTROLYTIC DEVICE

[75] Inventors: John W. Hooke; Charles E. Snyder, both of Gainesville, Fla.

[73] Assignee: General Electric Company, Gainesville, Fla.

[21] Appl. No.: 369,877

[22] Filed: Apr. 19, 1982

Related U.S. Application Data

[63] Continuation of Ser. No. 191,899, Sep. 29, 1980, abandoned.

[51] Int. Cl.³ .............................................. H01M 2/08
[52] U.S. Cl. ...................................... 429/183; 429/185
[58] Field of Search ............... 429/183, 181, 182, 184, 429/185

[56] References Cited

U.S. PATENT DOCUMENTS

| | | | |
|---|---|---|---|
| 3,644,149 | 2/1972 | Coffey et al. | 429/183 |
| 3,704,173 | 11/1972 | McClelland et al. | 429/183 |
| 4,215,187 | 7/1980 | Snider et al. | 429/181 X |
| 4,224,388 | 9/1980 | Stadnick . | |

FOREIGN PATENT DOCUMENTS

| | | |
|---|---|---|
| 757763 | 9/1956 | United Kingdom . |
| 997716 | 7/1965 | United Kingdom . |
| 1009630 | 11/1965 | United Kingdom . |
| 1056700 | 1/1967 | United Kingdom . |
| 1083780 | 9/1967 | United Kingdom . |
| 1167016 | 10/1969 | United Kingdom . |
| 1253544 | 11/1971 | United Kingdom . |
| 1329781 | 9/1973 | United Kingdom . |
| 1357720 | 6/1974 | United Kingdom . |
| 1434301 | 5/1976 | United Kingdom . |
| 1511856 | 5/1978 | United Kingdom . |

*Primary Examiner*—Charles F. LeFevour
*Attorney, Agent, or Firm*—Henry J. Policinski

[57] ABSTRACT

Terminal structure is disclosed for use in electrolytic devices such as batteries, in which a deformable, electrically conductive material (14) is caused to seal around an opening (26) in a container (10, 12) of resilient material by means of a fastener (24, 30) which extends through the opening into the electrically conductive material and a wedging element such as a chamfered surface (34) associated with the fastener which compresses the resilient material surrounding the opening. A method of assembling such a terminal structure is also disclosed.

8 Claims, 3 Drawing Figures

TERMINAL APPARATUS FOR ELECTROLYTIC DEVICE

This is a continuation of application Ser. No. 191,899, filed Sept. 29, 1980 now abandoned.

DESCRIPTION

1. Technical Field

The invention broadly concerns seal apparatus for use in association with conductors or conduits of various types which pass through the wall of a container enclosing a corrosive liquid. More particularly, the invention relates to a unique terminal apparatus for use in electrolytic devices such as batteries, in which the terminal conductors are led through the wall of the battery container and provided at the wall with a seal for preventing leakage of the corrosive electrolyte of the battery.

2. Background Art

Various approaches have been followed by those skilled in the art to solve the problem of sealing a battery terminal where it leaves the battery container. U.S. Pat. No. 3,704,173 issued to McClelland et al (the McClelland patent) discloses several terminal and seal apparatuses, one of which is illustrated in FIG. 1 of the accompanying drawing. In this prior art apparatus, the wall 10 of the battery container was provided with an inwardly extending annular boss 12. The deformable electrically conductive lead post 14 was seated within boss 12 and held in place by a self-tapping screw 16 which extended through an opening 18 provided in wall 10. Screw 16 served to expand the deformable material of post 14 into contact with the resilient interior walls of boss 12 and opening 18 and around a plurality of protruding ribs 20, so that a seal around post 14 was achieved which would prevent leakage of electrolyte from the interior of the battery container. A connector tab 22 was used to convey current from post 14.

While such prior art terminal apparatuses have achieved a measure of success, some difficulties have been experienced. Particularly, when assembling such prior art terminal apparatuses, the screw 16 may be overtightened in an attempt to ensure that post 14 is expanded fully into contact with boss 12 and ribs 20, thus hopefully producing a superior seal. However, since the resilient plastic of wall 10 did not yield appreciably upon contact by the relatively broad flat underside of the head of screw 16, much of the force required to tighten the screw 16 tended to be absorbed by the threads tapped into post 14. Since post 14 typically was of rather soft material such as lead, the resultant shear forces often were too high for the material to sustain, leading to stripping of the threads. This, in turn, was found to cause a failure to seal in the first instance or a later loss of seal in other instances.

DISCLOSURE OF THE INVENTION

The primary object of the invention is to provide an improved terminal apparatus for electrolytic devices, which effectively minimizes electrolyte leakage.

Another object of the invention is to provide an improved method of assembling such a terminal apparatus, which minimizes the potential for damaging the terminal components at assembly.

These objects are given by way of example only; thus, other desirable objectives and advantages inherently achieved by the disclosed apparatus and method may become apparent to those skilled in the art. The scope of the invention, however, is to be limited only by the appended claims.

A preferred embodiment of the terminal apparatus according to the invention is intended for use with electrolytic devices such as batteries in which a corrosive substance such as liquid electrolyte is to be retained in a container having a wall of resilient, electrolyte resistent material such as various rubbers and plastics. The previously mentioned McClelland patent refers to various materials suitable for use in the present invention and therefore is incorporated by reference into the present application. An opening is provided through the wall of the container so that an electrical terminal apparatus according to the invention may be installed. A body of deformable, electrically conductive material such as lead or one of the other materials mentioned in the McClelland patent, is seated against the wall across the opening. Typically, the body of deformable, electrically conductive material will be provided with an unthreaded, blind hole facing the opening in the container wall. Fastening means, such as a self-tapping screw or the like, extend through the opening and into the body to secure the body against the wall. A wedge means, such as a chamfer on the underside of the screw head, is provided in operative association with the fastening means, whereby the resilient material of the wall is progressively compressed as the chamfer or wedge is forced into the resilient material and the fastening means is driven into the body. The body of deformable, electrically conductive material thus forms a seal with the resilient material of the wall of the container.

By "progressively compressed" is meant that the wedge means, such as a chamfer, initially contacts and compresses only a narrow band of the resilient material surrounding the opening in the wall. As the fastening means is driven inward, the contact area around the opening widens as the wedge means moves into the resilient material and compresses a progressively wider band surrounding the opening. Due to the action of the wedge means, the material around the opening remains compressed when the driving force is removed. This compression maintains an axial load on the screw threads, thereby helping to maintain the desired seal. As indicated, a chamfer on the underside of the head of a screw will provide the desired wedging effect. As used in this application, "chamfer" means a continuous or discontinuous circumferential surface extending radially from the fastening means at an upward angle of less than ninety degrees to the axis of the fastening means, so that a progressively increasing contact are is achieved with the resilient material as the fastening means is driven inward. For example, surfaces having flat, concave or convex geometries can be considered as "chamfers" for purposes of the present application.

In one embodiment of the invention, the surface of the wall of the container is provided with protrusions such as axially extending annular ridges or ribs which engage the upper surface of the body to form a seal. The wall may also include a counter-bore or annular boss within which the deformable body is located and against which it seals when expanded by the fastening means.

In accordance with the method of the invention, the fastening means as previously described is subjected to an axial force toward the body, while being driven into the body, the force being sufficient to progressively deform the resilient material of the wall and to overcome axial forces resisting movement of the fastening means into the deformable body.

BEST MODE FOR CARRYING OUT THE INVENTION

Figure 1:
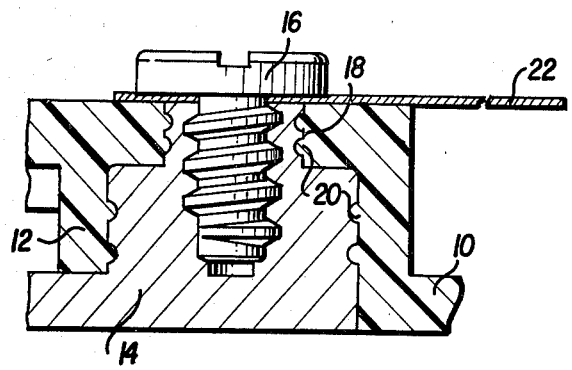
FIG. 1 shows an elevation view, partially in section, of a prior art terminal structure.

The following is a detailed description of the preferred embodiments of the invention, reference being made to the drawing in which like reference numerals identify like elements of structure in the Figures.

Figure 2:
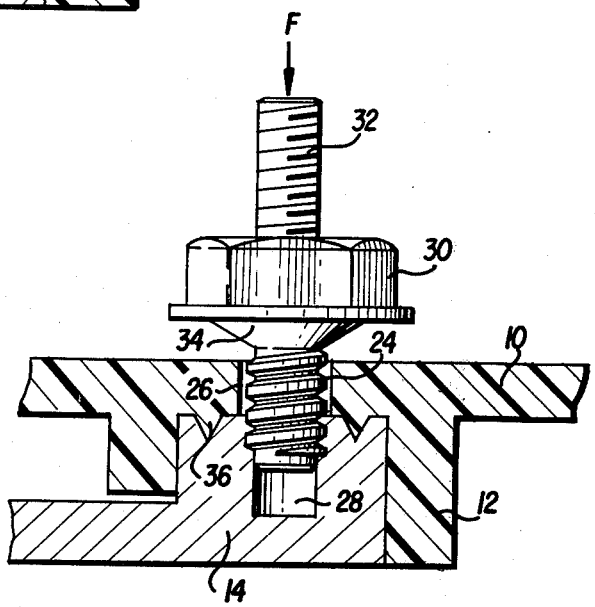
FIG. 2 shows an elevation view, partially in section, of a partially assembled terminal structure according to the present invention.
Figure 3:
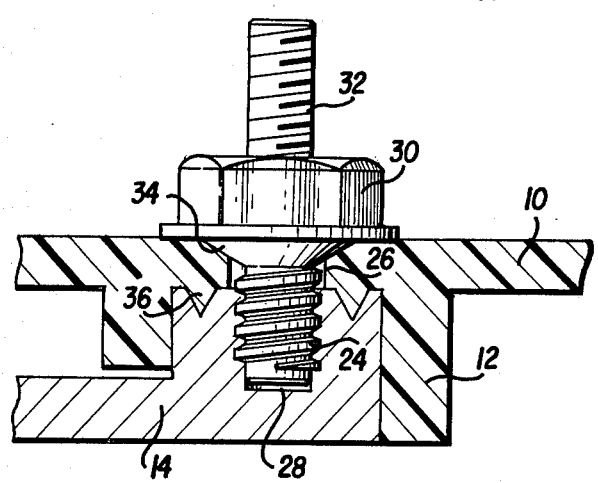
FIG. 3 shows an elevation view, partially in section, of an assembled terminal structure according to the invention.

Referring simultaneously to FIGS. 2 and 3, the wall 10 of the battery container is provided with an inwardly extending annular boss 12 and preferably is made from a resilient material of the type disclosed in the McClelland patent. Extending into boss 12 is a body or post 14 of a deformable, electrically conductive material such as lead or one of the other materials disclosed in the McClelland patent. A fastening means such as a self-tapping screw 24 extends through an opening 26 provided in wall 10 and into a blind bore 28 provided in post 14. In accordance with the invention, screw 24 comprises a hexagonal head portion 30 and an upwardly extending threaded terminal portion 32. On the underside of head portion 30 and operatively associated therewith is a wedge means such as an integral chamfered surface 34. Surface 34 may be a straight-sided frustrum of a cone, as shown, or may be concave or convex, as desired. Instead of making surface 34 integral with screw 24 as illustrated, those skilled in the art also may use a separate, chamfered washer without departing from the scope of the invention.

To complete the assembly of the terminal structure in accordance with the method according to the invention, screw 24 is rotated by applying torque to head 30 and simultaneously applying an axial load F downward toward post 14. The axial load may be provided by a pneumatic or hydraulic cylinder while head 30 is rotated. Or, the screw 24 may be driven using a lead screw with a fixed pitch. In any event, as screw 24 is driven into post 14, the deformable material of the post is displaced radially and axially into contact with the walls of boss 12, to effect the desired seal. Preferably, opening 26 is surrounded on the side of wall 10 facing post 14 by a protrusion such as at least one axially extending annular ridge or rib 36. This ridge engages the top surface of post 14 which deforms around the ridge to provide a further barrier to electrolyte leakage.

The magnitude of force F will vary depending on the precise choice of materials for wall 10 and body 14, as well as on the geometry of screw 24 and the wedge means or chamfer. However, the appropriate force is readily determinable by those skilled in the art in a given situation. As screw 24 enters body 14, the leading or lower edge of chamfer 34 eventually contacts the outer surface of wall 10, compressing the plastic in a very small local area which progressively widens as screw 24 turns. The plastic then yields, permitting the screw to advance before the shear strength of the material of body 14 is exceeded. When the axial force is removed, the residual axial load on the threads in body 14 is due primarily to the remaining compression of wall 10, as illustrated in FIG. 3.

Industrial Applicability

The terminal apparatus and assembly method according to the present invention may be used in a variety of applications where a conductor or the like is to be passed through the wall of a container for corrosive material.

Having described our invention in sufficient detail to enable those skilled in the art to make and use it, we claim:

1. An improved terminal apparatus for an electrolytic device of the type having a container comprising a wall of resilient, electrolyte resistant material, said apparatus comprising:

said wall having an opening;

a body of deformable, electrically conductive material seated against said wall across said opening;

fastening means extending through said opening and into said deformable electrically conductive material for securing said deformable, electrically conductive material against said wall;

wedge means operatively associated with said fastening means for progressively compressing said resilient material of said wall from the side of said wall opposite to said deformable, electrically conductive material, as said fastening means is driven into said deformable, electrically conductive material, whereby a seal is formed between said wall and said deformable, electrically conductive material; and an area of said wall around said opening, said area being compressed between said wedge means and said deformable, electrically conductive material, said compressed area of said wall providing a residual axial load on said fastening means, to help maintain said seal.

2. Apparatus according to claim 1, wherein said fastening means comprises a self-tapping screw.

3. Apparatus according to claim 1, wherein said wedging means comprises a chamfered surface extending radially outward from said fastening means, so that the radially innermost portion of said chamfered surface first compresses said resilient material.

4. Apparatus according to claim 3, wherein said fastening means comprises a self-tapping screw having a head portion, the underside of said head portion being configured to define said chamfered surface.

5. Apparatus according to claim 4, wherein said screw further comprises a threaded terminal post extending from said head portion on the side opposite to said chamfered surface.

6. Apparatus according to claim 1, wherein the surface of said wall surrounding said opening is provided with axially extending protrusions which engage said deformable, electrically conductive material.

7. Apparatus according to claim 1, wherein said deformable, electrically conductive material defines a post portion; said wall comprises a counterbore surrounding said opening and said post extends into said counterbore.

8. Apparatus according to claim 7, wherein said fastening means comprises means for expanding said post into contact with said counterbore.

* * * * *